(12) United States Patent
Tagra et al.

(10) Patent No.: US 11,069,034 B2
(45) Date of Patent: Jul. 20, 2021

(54) METHOD AND SYSTEM TO ENHANCE QUALITY OF DIGITAL IMAGES

(71) Applicant: ADOBE INC., San Jose, CA (US)

(72) Inventors: Sanjeev Tagra, Haryana (IN); Sachin Soni, New Delhi (IN); Ajay Jain, Up (IN); Ryan Rozich, Austin, TX (US); Prasenjit Mondal, Pin (IN); Jonathan Roeder, Round Rock, TX (US)

(73) Assignee: ADOBE INC., San Jose, CA (US)

( * ) Notice: Subject to any disclaimer, the term of this patent is extended or adjusted under 35 U.S.C. 154(b) by 97 days.

(21) Appl. No.: 16/563,315

(22) Filed: Sep. 6, 2019

(65) Prior Publication Data

US 2021/0073949 A1 Mar. 11, 2021

(51) Int. Cl.
| | |
|---|---|
| *G06T 5/00* | (2006.01) |
| *G06T 7/12* | (2017.01) |
| *G06N 3/08* | (2006.01) |
| *G06T 7/136* | (2017.01) |
| *G06T 7/11* | (2017.01) |

(52) U.S. Cl.
CPC ............. *G06T 5/002* (2013.01); *G06N 3/08* (2013.01); *G06T 7/11* (2017.01); *G06T 7/12* (2017.01); *G06T 7/136* (2017.01)

(58) Field of Classification Search
None
See application file for complete search history.

(56) References Cited

U.S. PATENT DOCUMENTS

| | | | |
|---|---|---|---|
| 2016/0217476 A1 | 7/2016 | Duggal et al. | |
| 2016/0232680 A1* | 8/2016 | Peana | G06T 11/001 |
| 2017/0293940 A1 | 10/2017 | Aggarwal et al. | |
| 2017/0301095 A1* | 10/2017 | Zhang | G06T 7/12 |
| 2018/0114096 A1* | 4/2018 | Sen | G06T 15/06 |

* cited by examiner

*Primary Examiner* — Leon Flores
(74) *Attorney, Agent, or Firm* — F. Chau & Associates, LLC

(57) ABSTRACT

The present disclosure relates to a computer-implemented method for generating an enhanced image from an original image, the method including segmenting the original image into a segmented image using an artificial neural network; curve fitting the segmented image to determine boundary artifacts; removing the determined boundary artifacts to generate a smoothed boundary image; and generating the enhanced image from the original image and the smoothed boundary image. The image maybe enhanced further by correcting for glare and adding artificial light.

19 Claims, 15 Drawing Sheets

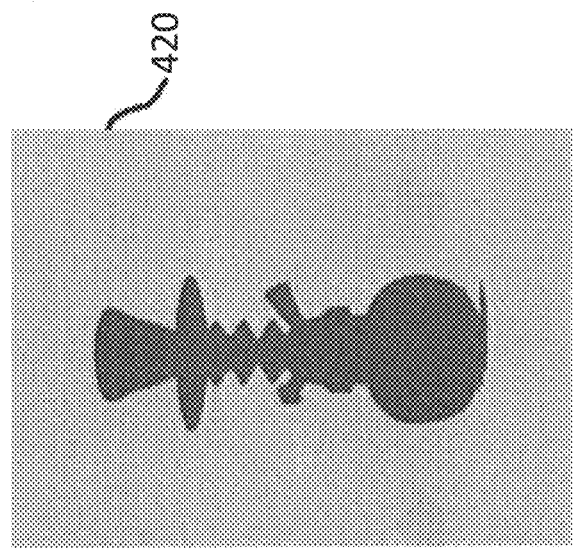
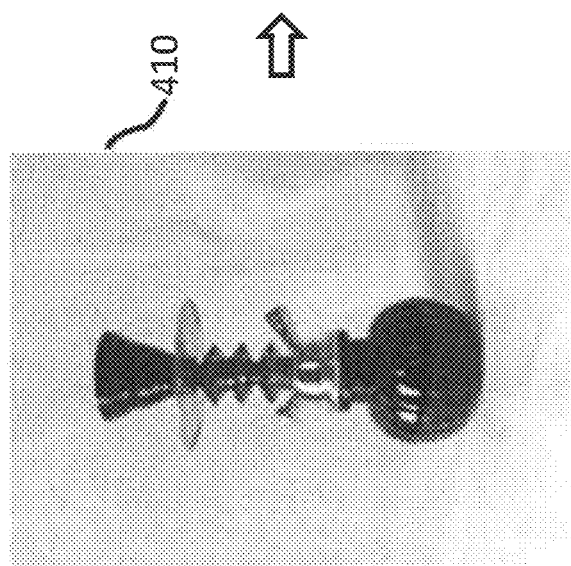
FIG. 4

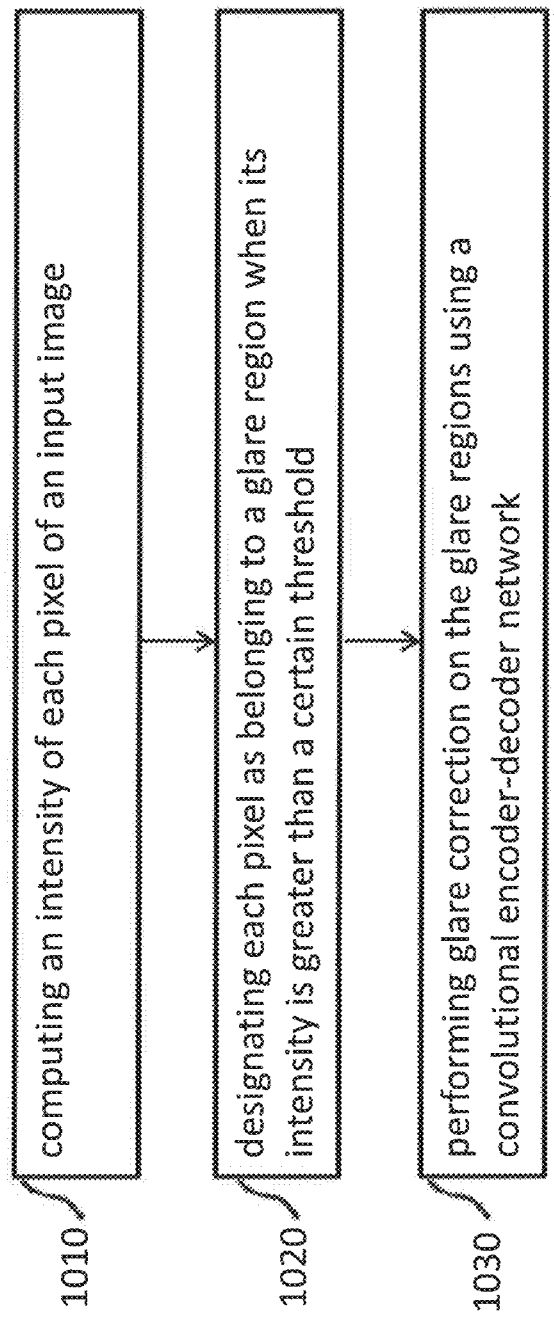

METHOD AND SYSTEM TO ENHANCE QUALITY OF DIGITAL IMAGES

TECHNICAL FIELD

This disclosure relates generally to digital images, and more particularly to a method and system for improving the quality of digital images captured under sub-optimal conditions.

DISCUSSION OF RELATED ART

Product photography is important to the success of any eCommerce store. A user who lands on a product page of a marketer's website may be discouraged from purchasing if digital images of listed products are in poor quality.

An eCommerce store may support a full range of sellers, from a high-end multimillion dollar brand to a next-door retail shop. Accordingly, each seller may use photography equipment and setups of varying quality in photographing their products. Setups that provide sufficient artificial white light independent of outside light tend to capture high quality photographs. Since these setups are typically large in size and require a large physical space and capital, many sellers opt for less expensive setups, e.g., either setups that are dependent on outside light or use low quality lighting equipment to illuminate the product. However, these less expensive setups produce photographs of varying quality, and may appear quite dull.

A seller can edit these photographs using photo editing applications to make them eCommerce ready. However, this edit process may require an extraneous amount of time with multiple manual iterations and is an extra burden on the seller. Further, the edited photographs may be sub-optimal if the seller is not skilled at using the photo editing application. While a professional photographer could be hired to perform the product photography, many sellers cannot afford such a professional.

Thus, there are several technical problems with regard to conventional mechanisms for improving quality of digital images.

SUMMARY

Embodiments of the disclosure provide techniques for converting product photographs taken in home setups to professional eCommerce ready photographs.

An exemplary embodiment of the present disclosure provides a computer-implemented method for generating an enhanced image from an original image, the method including: segmenting the original image into a segmented image using an artificial neural network; curve fitting the segmented image to determine boundary artifacts; removing the determined boundary artifacts from the segmented image to generate a smoothed boundary image; and generating the enhanced image from the original image and the smoothed boundary image.

An exemplary embodiment of the present disclosure provides a cloud-based system that performs an image enhancement function, the system including a cloud-based service configured to execute on a host server, the host server configured to connect to a client device over a computer network and to receive from the client device an upload of an original image across the computer network, where the service performs an image enhancing function that segments the original image into a segmented image, applies a smoothing to edges of the segmented image to generate a smoothed boundary image, and applies transformations used in the smoothing to the original image to generate the enhanced image, and then the service outputs the enhanced image to the client device.

The system may also be implemented locally on the client device without involving a server providing the cloud-based service. For example, the image enhancing function of the cloud-based service can be operated directly on the client device.

The image may be enhanced further by applying a function to correct for glare and/or to add artificial light. For example, different types of artificial light may be added to the enhanced image to generate different versions of the enhanced image, which can be presented to the user so they can select the enhanced image they find most useful for their application.

An exemplary embodiment of the present disclosure provides a server for enhancing images. The server includes an image enhancement program to segment an original image received from a client device through a network interface to generate a segmented image including a plurality of segments so that each segment has a different visual characteristic from another segment, determine boundary artifacts in the segmented image, and remove pixels of the original image having coordinates of the boundary artifacts to generate an enhanced image; and an image presentation program configured to use the network interface to output the enhanced image to the client device.

BRIEF DESCRIPTION OF THE DRAWINGS

The detailed description describes one or more embodiments with additionally specificity and detail through use of the accompanying drawings, briefly described below

FIG. 4 illustrates examples of an intermediate image generated during the segmenting and an output image of the segmenting.

FIG. 10 illustrates a method of removing glare from an image according to an exemplary embodiment of the disclosure.

DETAILED DESCRIPTION OF THE
EXEMPLARY EMBODIMENTS

Retailers selling goods online save on costs in operating in a physical space and having their goods displayed for consumers to look, feel, try on, or sample before making a purchase. To convey as close as possible the same look and feel effects of an actual physical store, the online retailer must have high quality product photography. The production of high quality product photos represents a major part of any eCommerce retailer's business model.

The present disclosure provides approaches for enhancing the quality of digital images. These approaches can be used to convert product photographs taken in home setups to professional eCommerce ready photographs. The captured image may be segmented into a plurality of segments using an artificial neural network such as a Convolutional Neural Network (CNN), boundary artifacts of the segments may be determined using a curve fitting algorithm and removed from the segments to generate a smoothed image, and the smoothed image may be used to enhance the quality of the captured image. Internal artifacts caused by glare (e.g., reflection) may be detected and corrected and then artificial lighting may be added to objects within the enhanced image for realistic visualization. The artificial lighting may be generated by considering mood & texture, dramatic lighting, natural lighting, and soft lighting effects. A graphical user interface (GUI) element may be added to an existing application or eCommerce platform to perform the image enhancing function. For example, the user can drag and drop an icon of an image to enhance onto the GUI element to trigger enhancement of the image. Enhanced images produced by embodiments of the disclosure enable sellers to save on costs and time while increasing the likelihood that their products will sell.

Figure 1A:
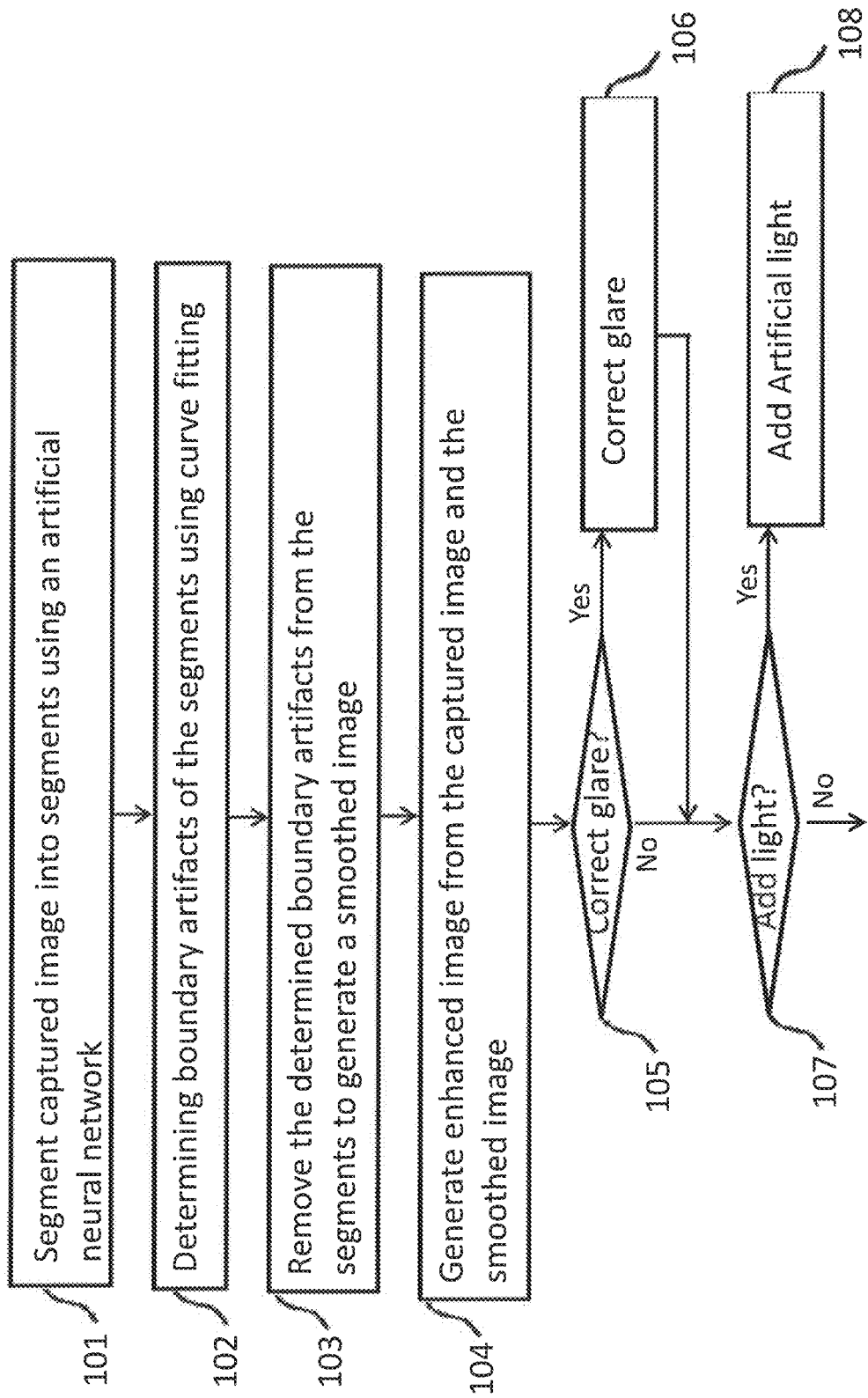
FIG. 1A is a block diagram illustrating a method of generating an enhanced image from a captured image according to an exemplary embodiment of the disclosure.

FIG. 1A is a block diagram of a method of generating an enhanced image from a captured image, according to an exemplary embodiment of the inventive concept. The method of FIG. 1A includes segmenting the captured image into segments using an artificial neural network (ANN) (step 101). For example, the ANN may be a convolutional neural network (CNN). The method of FIG. 1A further includes determining boundary artifacts of the segments using curve fitting (step 102). The method of FIG. 1A further includes removing the determined boundary artifacts from the segments to generate a smoothed image (step 103). The method of FIG. 1A further includes generating the enhanced imaged from the captured image and the smoothed image (step 104). If it is determined that glare correction is desired (step 105), then the image is further enhanced by correcting for glare (step 106). If it is determined that addition of artificial light is desired (step 107), then the image is further enhanced by adding artificial light (step 108). The segmenting, determination of the boundary artifacts, removal of the boundary artifacts, generating of the enhanced image, glare correction, artificial light additional will be described in greater detail below.

Figure 1B:
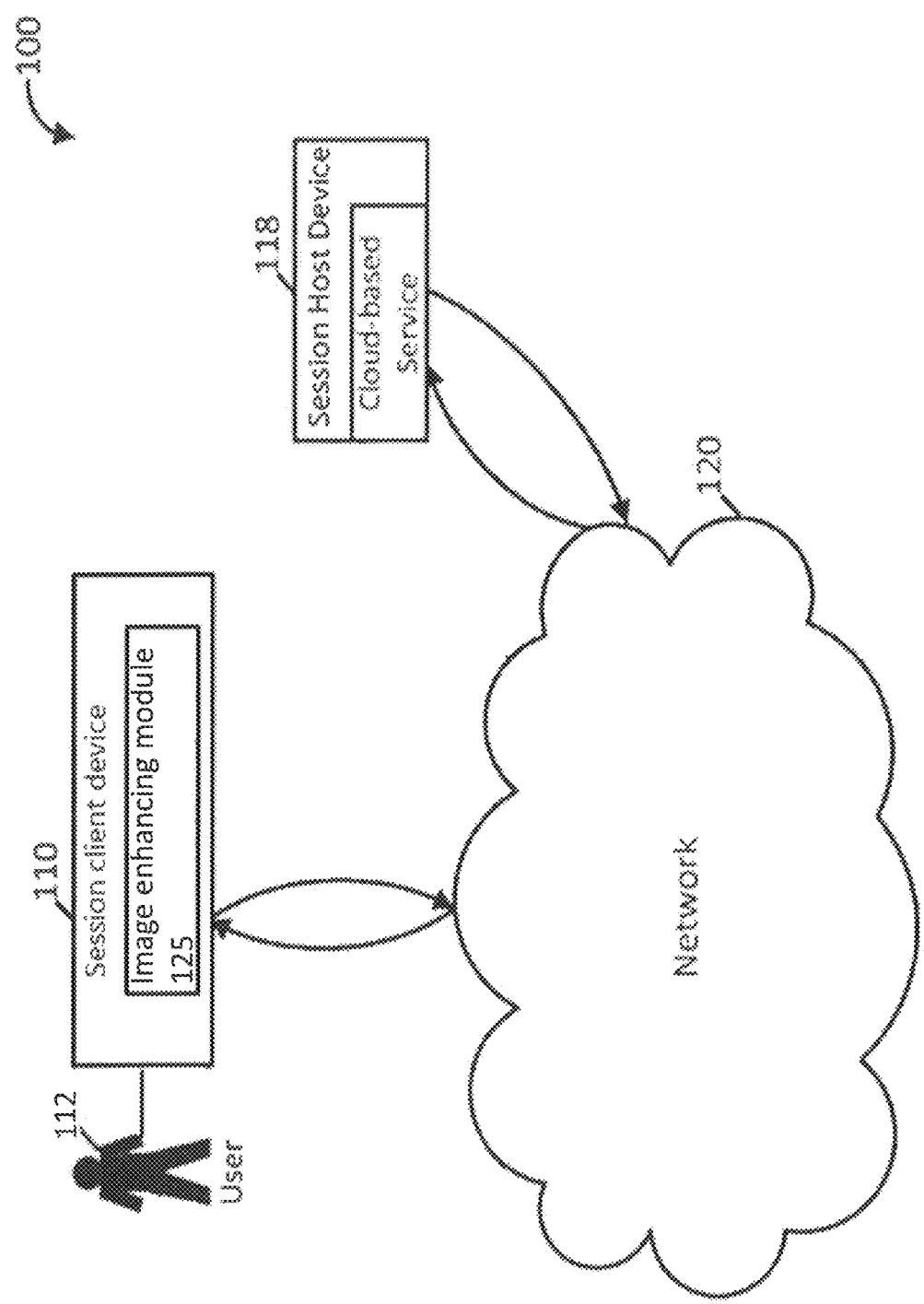
FIG. 1B is a block diagram illustrating a cloud-based system for enhancing images according to an exemplary embodiment of the disclosure.

FIG. 1B is a block diagram illustrating a cloud-based system that performs an enhancement operation on a digital image received from a remote user to generate one or more enhanced digital images and provides the enhanced images to the user according to an exemplary embodiment of the inventive concept.

As shown in FIG. 1B, the system 100 includes a client device 110, a host device 118, and a communication network 120. The client device 110 may include an image enhancing module 125. User 112 is a user of the system 100. In an exemplary embodiment, the user 112 uses a browser of the client device 110 to navigate to a website, downloads a plugin/extension from the website that installs the image enhancing module 125 onto the client device 110. While a single user 112 is illustrated, the system 100 is not limited thereto, and may include multiple users. While a single client device 110 is illustrated, the system 100 is not limited thereto, and may include multiple client devices.

Each of the client device 110 and the host device 118 and at least some portion of the communication network 120 are or include one or more programmable devices. These programmable devices may be any of a variety of standardized and special purpose devices, such as personal computers, workstations, servers, cellular telephones, and personal digital assistants. Broadly stated, the network 120 may include any communication network through which programmable devices may exchange information. For example, the network 120 may be a public network, such as the Internet that is implemented with various IP-based network forwarding devices. The network 120 may also be or include other public or private networks such as LANs, WANs, cellular networks, extranets and intranets.

In some embodiments, the network 120 is configured to communicate (e.g., transmit or receive) information with connected programmable devices, such as the client device 110 and the host device 118. The network 120 may be configured to communicate both synchronous information streams and asynchronous information packets. When executing according to its configuration in one example, the network 120 receives streams including image data, requests (e.g., a build request), or acknowledgements from the client device 110 for transmission to the host device 118 and receives streams including image data, a play file, requests, or acknowledgements from the host device 118 for transmission to the client device 110. When executing according to another configuration, the network 120 receives packets including image data, requests or acknowledgements from the client device 110 for transmission to the host device 118 and receives packets including image data, a play file, requests, or acknowledgements from the host device 118 for transmission to the client device 110.

In some embodiments illustrated by FIG. 1B, the client device 110 is configured to execute one or more processes that support a communication session between the client device 110 and the host device 118. In these embodiments, the client device 110 is configured to execute one or more processes that transmit packets including image data, requests, or acknowledgments to the host device 118. When executing according to this configuration, the client device 110 implements a variety of components described below with reference to FIG. 2.

Figure 1C:
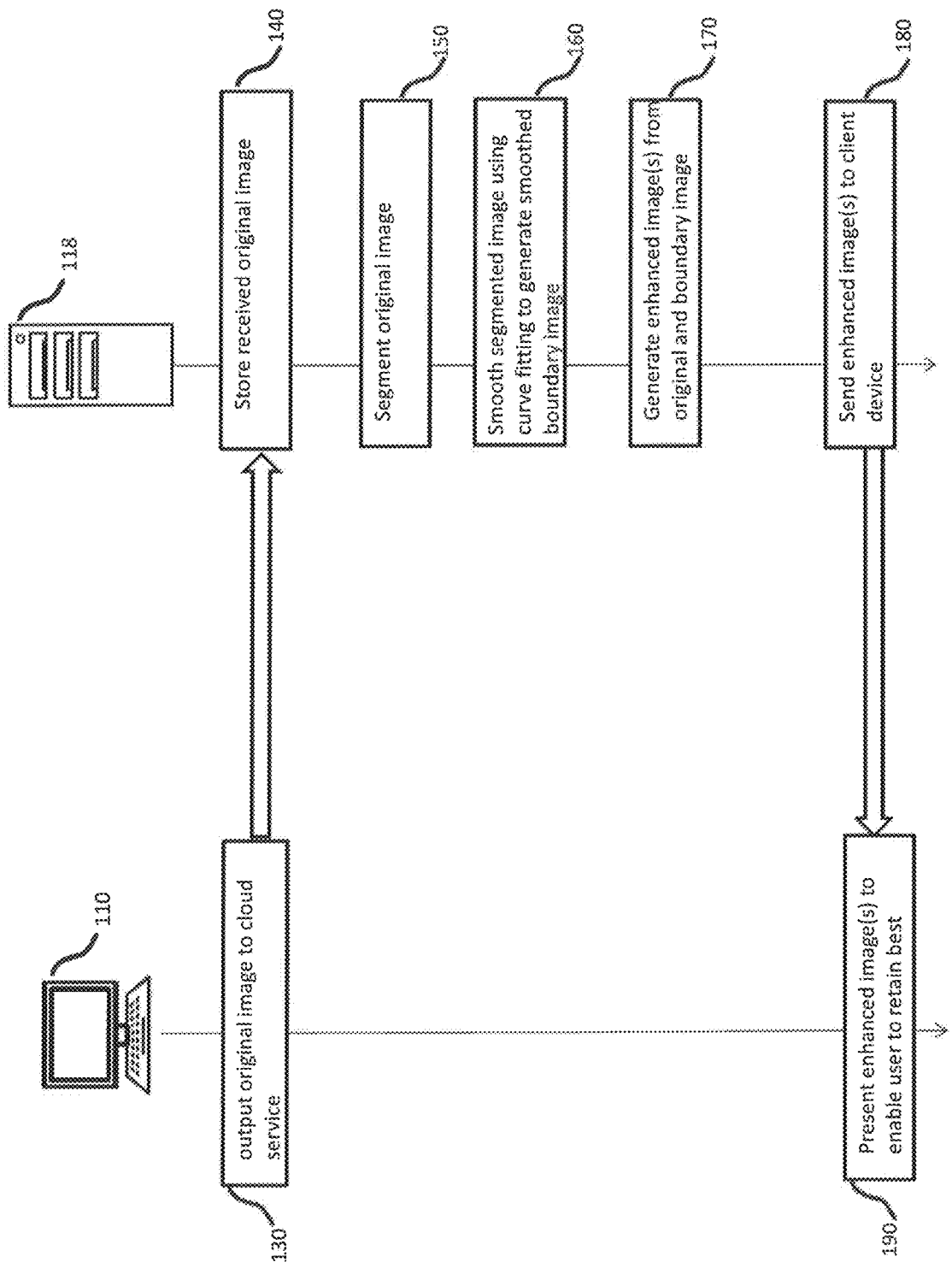
FIG. 1C shows an exemplary workflow of the system according to an exemplary embodiment of the disclosure.

FIG. 1C illustrates an exemplary workflow between the client device 110 and the host device 118 to enhance a digital image (e.g., a photograph). The workflow includes the client device 110 outputting an original image to a cloud-service managed by the host device 118 (step 130). The original image (e.g., a digital image) may correspond to a photograph of a product that was captured during less than ideal conditions (e.g., poor lighting). The output of the original image maybe triggered by the user 112 invoking the image enhancing module 125 using a graphical user interface (GUI) of the client device 110, using a first graphical element of a GUI of the image enhancing module 125 to select one of a plurality of available images, and using a second graphical element of the GUI of the image enhancing module 125 to direct performance of an image enhancing function on the selected image. The host device 118 then receives the original image and locally stores the original image (step 140). The GUI may also include selectable choices that enable the user 112 to indicate whether glare correction could be applied, whether artificial lighting should be added, and the type of artificial lighting to added. Thus, in addition to receiving the original image from the client device 110, the host device 118 may also receive parameters from the client device 110 indicating whether to apply glare correction, whether to apply artificial lighting, and the type of artificial lighting to apply. The types may be based on at least one of a mood and lighting effect, a dramatic lighting effect, a natural lighting effect, or a soft lighting effect. For example, the GUI may enable the user to specify one or more of these effects for the host device 118 to consider when applying the artificial lighting.

The workflow further includes the host device 118 performing a segmentation on the original image to generate a segmented image (step 150). Next, the workflow includes the host device 118 smoothing the segmented image using a curve fitting algorithm to generate a smoothed boundary image (step 160). The smoothing may involve using the curve fitting algorithm to remove boundary artifacts of the segmented image. The smoothing may include detecting edges within the segmented image and smoothing those edges. Next, the workflow includes the host device 118 generating at least one enhanced image from the original image and the smoothed boundary image (step 170). For example, the transformations applied during the smoothing to smooth the edges in the segmented image may be applied to the original image to generate the enhanced image. The workflow then includes the host device 118 sending the enhanced image(s) to the client device 110 (step 180). The received enhanced images(s) may be stored on the client device 110.

The workflow of FIG. 1C further includes the client device 110 presenting the received enhanced image(s) on a display of the client device 110 so that user 112 can select one or more of these images to retain for later use (step 190). For example, the user 112 can upload a retained image to a directory referenced by their product website. For example, if a web page of the product website references a filename of an image of a product represented by the original image, the uploaded image can be given the same filename so that the webpage now presents the enhanced image.

Figure 2:
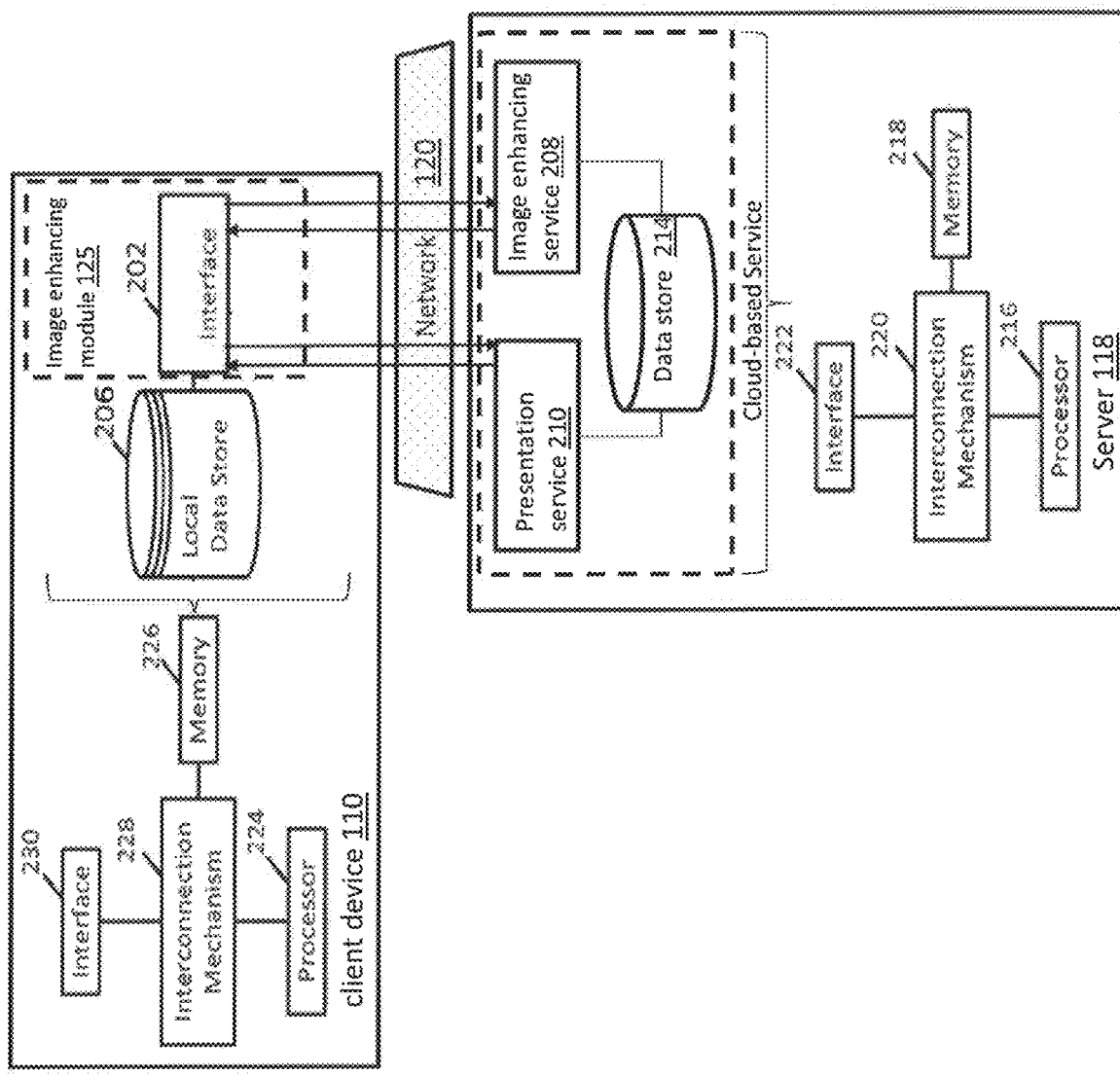
FIG. 2 is a block diagram illustrating an exemplary client device and host device of the system according to exemplary embodiment of the disclosure.

FIG. 2 shows a more detailed view of the client device 110 and the host device 118. As shown in FIG. 2, the client device 110 includes a processor 224, a memory 226, an interconnection mechanism 228, an image enhancing module 125, and a local data store 206 (e.g., a database). The host device 118 includes a processor 216, a memory 218, an interconnection mechanism 220, an interface 222, an image enhancing service (e.g., a software module) 208, a presentation service 210 (e.g., a software module), and a data store 214 (e.g., a database). The image enhancing module 125 includes an interface 202 that interfaces with the image enhancing service 208 (e.g., an image enhancement program) and the presentation. service 210 (e.g., an image presentation program).

As illustrated in FIG. 2, the host device 118 and the client device 110 each include a suite of components. These components are the processor 224, the memory 226, the interconnection mechanisms 228, and the interface 230. Although the particular types and models of the standard components may vary between any two of the programmable devices described herein, it is appreciated that each programmable device includes a processor, memory, interconnection mechanism, and an interface as described below with reference to the host device 118.

The interface 230 includes one or more physical interface devices such as input devices, output devices, and combination input/output devices and a software stack configured to drive operation of the devices. Interface devices may receive input or provide output. More particularly, output devices (e.g., display devices, printers, etc.) may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 228 is a communication coupling between the processor 224, the memory 226, and the interface 230. The interconnection mechanism 228 may include one or more physical busses in conformance with specialized or standard computing bus technologies such as IDE, SCSI, PCI, and InfiniBand. The interconnection mechanism 228 enables communications, including instructions and data, to be communicated between the processor 224, the memory 226, and the interface 230.

The memory 226 includes readable and/or writeable data storage that stores programs and data used or manipulated during operation of a programmable device. The programs stored in the memory 226 are a series of instructions that are executable by the processor 224. The memory 226 may include relatively high performance data storage, such as registers, caches, dynamic random access memory, and static memory. The memory 226 may further include a relatively low performance, ion-volatile data storage medium such as flash memory or an optical or magnetic disk. Various embodiments may organize the memory 226 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processor 224 executes a series of instructions (i.e., one or more programs) that result in manipulated data. The processor 224 may be any type of processor, multiprocessor, microprocessor, or controller known in the art. The processor 224 is connected to and communicates data with the memory 226 and the interface 230 via the interconnection mechanism 228. In an embodiment, the processor 224 causes data to be read from a non-volatile (i.e., non-transitory) data storage medium in the memory 226 and written to high performance data storage. The processor 224 manipulates the data within the high performance data storage, and copies the manipulated data to the data storage medium after processing is completed.

In addition to the standard suite of components described above, both the host device 118 and the client device 110 include several customized components. For example, the host device 118 includes the image enhancing service 208, the presentation service 210, and the data store 214. In at least one embodiment, each of these customized components is implemented by the processor 216. As shown in FIG. 2, the customized components of the client device 110 include the image enhancing module 125 and the local data store 206.

In an exemplary embodiment, the interface 202 of the client device 110 provides the user 112 with a graphical user interface (GUI) when the user 112 selects a graphical element from their Internet browser that was added to the browser due to the above-described plugin/extension installation. For example, the graphical element may include a dropdown menu with selectable choices having labels such as "enhance image" that opens a window enabling the user 112 to search for or enter the name of a digital image to enhance. The window may also include an area onto which the digital image is dropped for it to be enhanced. For example, the user could drag and drop an icon representing the digital image onto the area to generate an enhanced image from the digital image. In an alternate embodiment, the GUI is presented independent of the Internet browser when the user selects an icon on a display of the client device 110 that launches the image enhancing module 125 as a standalone application. The digital image may have various different image file formats such as JPEG, TIFF, GIF, BMP, PNG, etc. The interface 202 can then send the digital image to enhance across the computer network 120 to the image enhancing service 208. Steps 140-180 of FIG. 1C may be performed by the image enhancing service 208. The digital image (i.e., the original image) received during step 140 may be stored by the image enhancing service 208 in the data store 214 of the server 118.

The image enhancing service 208 may execute steps 150-170 of FIG. 1C to generate the enhanced images(s) from the original image for storage in data store 214. The presentation service 210 may retrieve the enhanced images(s) stored in the data store, and execute step 180 of FIG. 1C to send the enhanced images(s) across the network 120 to interface 202 of the client device 110. The interface 202 may execute step 190 of FIG. 1C to present the enhanced images(s) on a display of the client device 110 to enable the user 112 to select one or more of the presented enhanced image(s) to store in data store 206. The user 112 can then use a file transfer program (e.g., FTP) of the client device 110 to upload an enhanced image from the data store 206 to a website of the user 112. The user 112 may also use a client program to interface with and upload the enhanced image to an eCommerce platform or marketplace.

Figure 3:
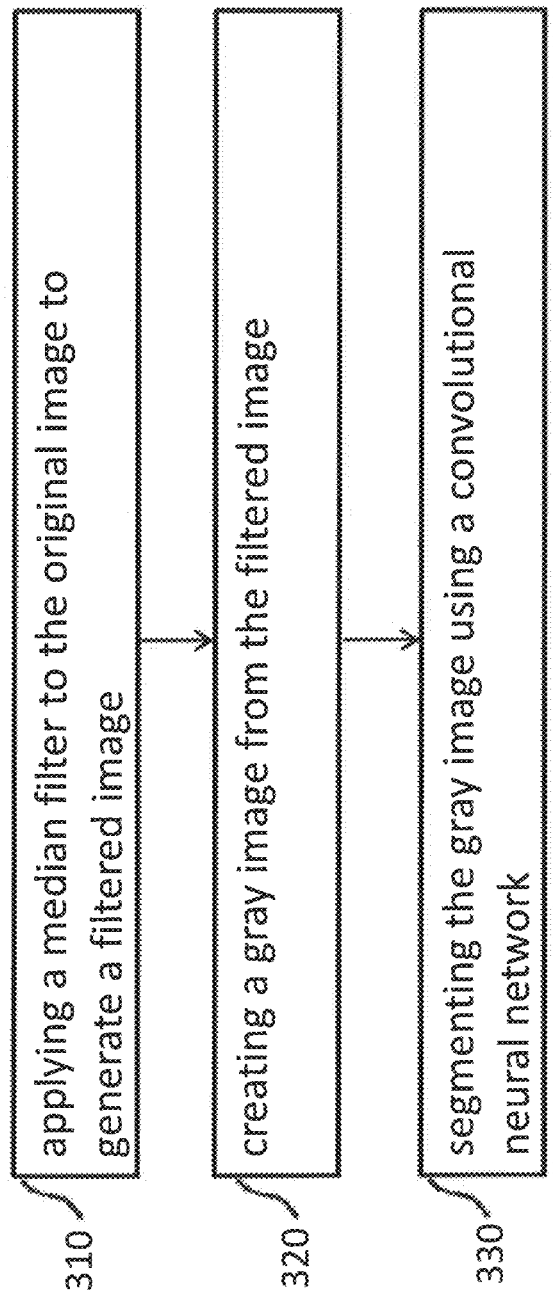
FIG. 3 illustrates a method for segmenting an image, according to an exemplary embodiment of the disclosure.

FIG. 3 illustrates a method of segmenting an original image. The segmenting process is performed by the image enhancing service 208 implementing step 150 of FIG. 1C, according to an exemplary embodiment of the disclosure.

The method of FIG. 3 includes applying a median filter to the original image to generate a filtered image (step 310). In an exemplary embodiment, the median filter is configured with suitable parameters for noise removal. The application of the median filter may include replacing each pixel of the original image with a median of neighboring entries.

The method of FIG. 3 further includes creating a gray image from the filtered image (step 320). For example, the filtered image may be a color image where the creation of the pray image includes converting the color image to an image including only grays. For example, each pixel in the color image may be converted into a gray color having an intensity based on the intensity of the color of the corresponding pixel.

The method of FIG. 3 further includes segmenting the gray image by assigning a label to every pixel in the image using an artificial neural network (step 330). The use of a convolutional neural network (CNN) as the artificial neural network according to an example embodiment will be described hereinbelow. The segmenting may result in a segmented image that includes a plurality of segments, where pixels of each segment share one or more visual characteristics (e.g., a same color, shading, text, lighting, etc.). For example, the CNN may be based on a semantic image segmentation technique. In an exemplary embodiment, the CNN includes a stack of a number of convolutional layers, with same padding to preserve dimensions, and outputs a final segmentation map. This CNN configuration learns a mapping from the input image (e.g., the gray image) to its corresponding segmentation through successive transformation of feature mappings. For deep convolutional networks, earlier layers tend to learn low-level concepts while later layers develop more high-level (and specialized) feature mappings. To maintain expressiveness, the number of feature maps (channels) typically need to he increased for the later layers in the network. To alleviate the computational burden, the feature maps may be periodically downsampled through pooling or strided convolutions (i.e., compressing the spatial resolution). However, for image segmentation, it is desirable for the model to produce a full-resolution semantic prediction. Accordingly, in an exemplary embodiment of the disclosure, the CNN is implemented using an encoder/decoder structure where the spatial resolution of the input is downsampled, thereby developing lower-resolution feature mappings, which are learned to be highly efficient at discriminating between classes. According to another embodiment, the feature representations may be upsampled into a full-resolution segmentation map.

FIG. 4 illustrates an exemplary output of the CNN model. For example, as shown in FIG. 4, gray image 410 is input to the model and segmented image 420 is the output from the model based on the input gray image 410.

Figure 5:
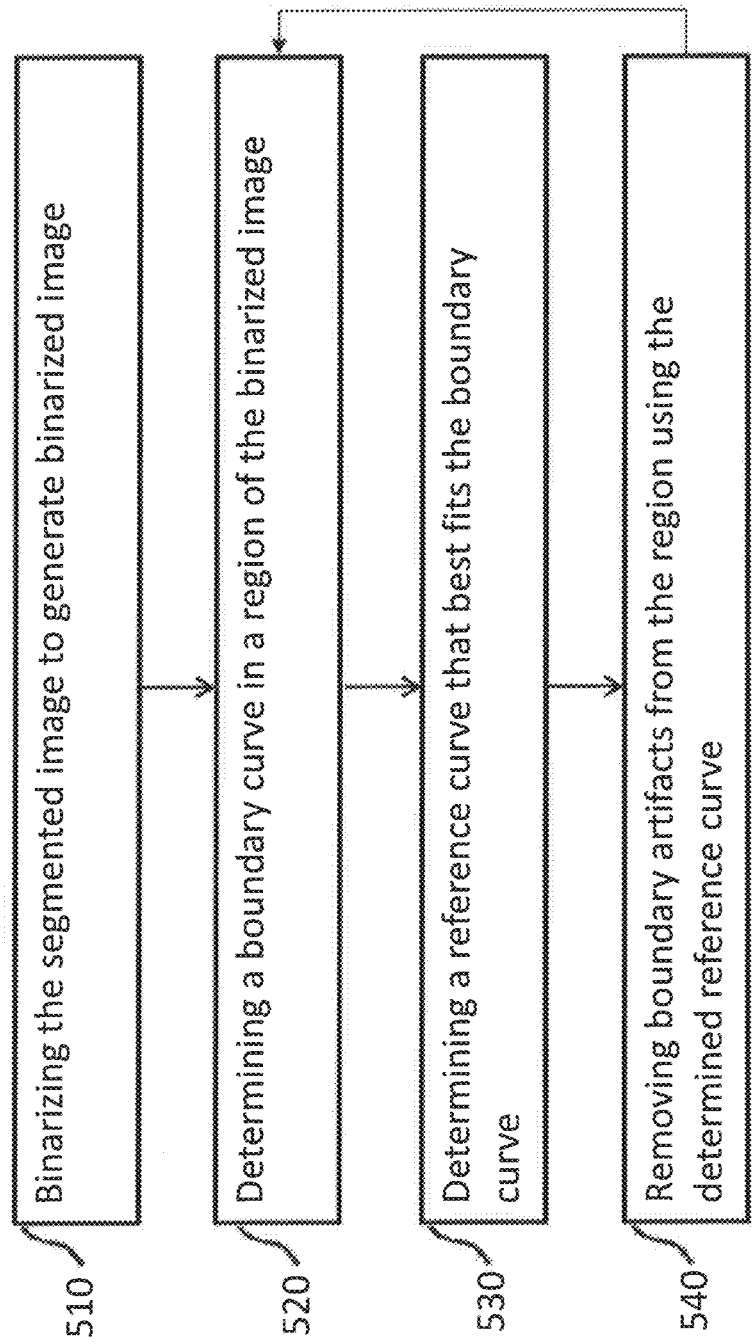
FIG. 5 illustrates a method of smoothing the segmented image using a curve fitting algorithm according to an exemplary embodiment of the disclosure.
Figure 6:
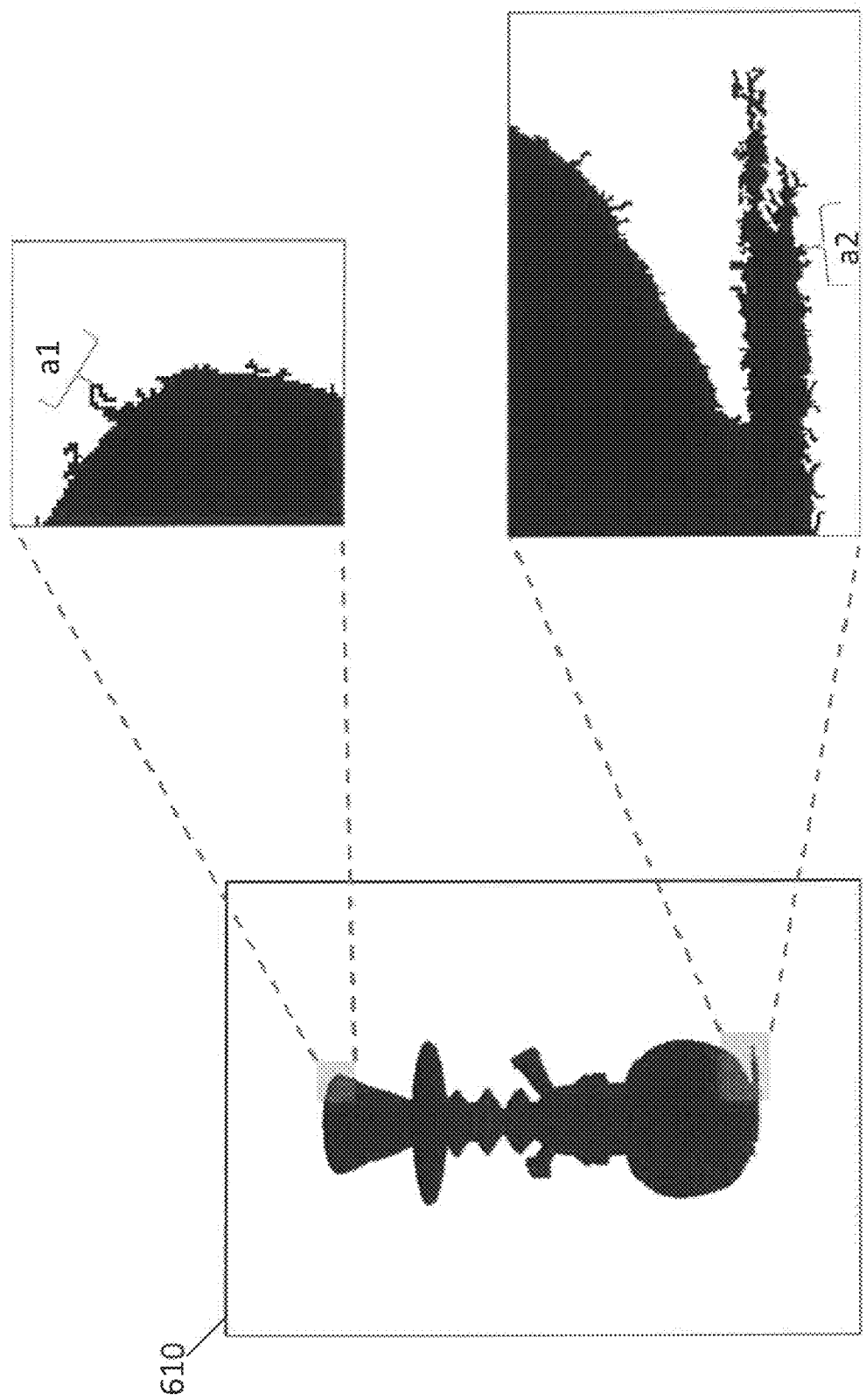
FIG. 6 illustrates exemplary boundary artifacts that may be removed during the smoothing.

FIG. 5 illustrates a method performed by the image enhancing service 208 for implementing step 160 of FIG. 1C for smoothing the segmented image using curve fitting to generate the smoothed boundary image, according to an exemplary embodiment of the disclosure. The method of FIG. 5 includes binarizing the segmented image to generate a binarized image (step 510). The segmented image includes one or more grays that are converted into either black or white in the binarized image. For example, the grays below a certain intensity can be set to black and the gray's above the certain intensity can be set to white. Alternately, the segmented image can be converted to the binarized image using a local thresholding based binarization algorithm. The local thresholding based binarization image chooses different threshold values for every pixel in the image. The threshold value of a given pixel may be chosen based on an analysis of its neighboring pixels. For example, if first and second pixels of the image each have an intensity of 250, and the threshold associated with the first pixel is 251 and the threshold associated with the second pixel is 249, then the first pixel would be set to black and the second pixel would be set to white even though the pixels have the same intensity. FIG.6 illustrates an example of the binarized image 610, where some areas of the binarized image have been enlarged to show that the target object boundary contains artifacts a1 and a2. For example, curve fitting may be applied to the binarized image to remove these artifacts to generate the smoothed boundary image.

Curve fitting is the process of constructing a curve, or mathematical function, that has the best fit to a series of data points, possibly subject to constraints. Curve fitting can involve either interpolation, where an exact fit to the data is required, or smoothing, in which a "smooth" function is constructed that approximately fits the data. Curve fitting can be done using regression analysis, which focuses more on statistical inference such as how much uncertainty is present in a curve that is fit to data observed with random errors. Fitted curves can be used as an aid for data visualization, to infer values of a function where no data are available, and to summarize the relationships among two or more variables. Extrapolation refers to the use of a fitted curve beyond the range of the observed data, and is subject to a degree of uncertainty since it may reflect the method used to construct the curve as much as it reflects the observed data.

In a simple example of curve fitting, one fits a function of the form y=f(x). The first degree polynomial equation y=ax+b is a line with slope a. A line will connect any two points, so a first degree polynomial equation is an exact fit through any two points with distinct x coordinates. If the order of the equation is increased to a second degree polynomial, the following results: y=ax2+bx+c. This will exactly fit a simple curve to three points. If the order of the equation is increased to a third degree polynomial, the following is obtained: y=ax3+bx2+cx+d. This will exactly fit four points. A more general statement would be to say it will exactly fit four constraints. Each constraint can be a point, angle, or curvature (which is the reciprocal of the radius of an osculating circle). Angle and curvature constraints are most often added to the ends of a curve, and in such cases are called end conditions. Identical end conditions are frequently used to ensure a smooth transition between polynomial curves contained within a single spline. Higher-order constraints, such as "the change in the rate of curvature", could also be added. The first degree polynomial equation could also be an exact fit for a single point and an angle while the third degree polynomial equation could also be an exact fit for two points, an angle constraint, and a curvature constraint. Many other combinations of constraints are possible for these and for higher order polynomial equations. If there are more than n+1 constraints (n being the degree of the polynomial), the polynomial curve can still be run through those constraints. An exact fit to all constraints is not certain (but might happen, for example, in the case of a first degree polynomial exactly fitting three collinear points). In general, however, some method is then needed to evaluate each approximation. The least squares method is one way to compare the deviations. The method of least squares may be used to approximate the solution of overdetermined systems, i.e., sets of equations in which there are more equations than unknowns. "Least squares" means that the overall solution minimizes the sum of the squares of the residuals made in the results of every single equation.

The curve fitting may be performed using the remaining steps of the method of FIG. 5, which further includes determining a boundary curve in a region of the binarized image (step 520), determining a reference curve (e.g., a curve based on a certain polynomial) that best fits the boundary curve (step 530), and removing the boundary artifacts from the region using the determined reference curve (step 540). The method may resume to step 520 repeatedly until all regions of the binarized image have been processed.

In an exemplary embodiment, the step 520 of determining the boundary curve includes considering an (i,j)th pixel of the binarized image as a boundary pixel if a) the (i,j)th pixel is a pixel of a first color (e.g., black) and b) any one of 8 neighborhood pixels of the (i,j)th pixel is a pixel of a second color different from the first color (e.g., white), where the pixels are arranged into rows and columns, the 'i' refers to an index of one of the rows, and the 'j' refers to an index of one of the columns. For example, the pixels considered to be boundary pixels can be retained and the others can be discarded to generate the boundary curve. In an alternate embodiment, the first color is white while the second color is black.

Figure 7:
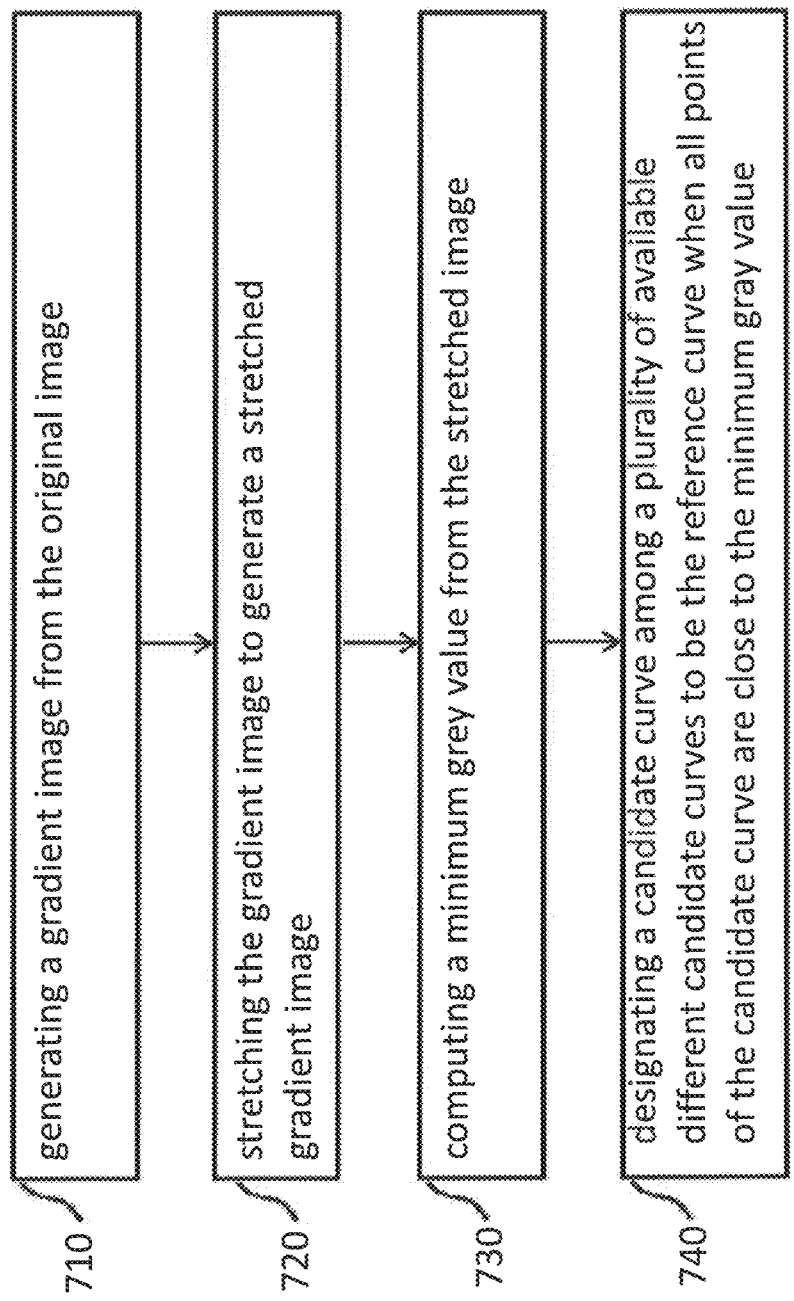
FIG. 7 illustrates a method of determining a curve to be used during the curve fitting algorithm according to an exemplary embodiment of the disclosure.

In an exemplary embodiment, the step 530 of determining the reference curve that best fits the boundary curved is performed using a method in an example embodiment, illustrated in FIG. 7.

The method of FIG. 7 includes generating a gradient image from the original image (e.g., 410) (step 710). In an exemplary embodiment, a gradient image or an image gradient, is a directional change in the intensity or color in an image. In an exemplary embodiment, the gradient of an image $\nabla f$ is a vector of its partials. For example $$\nabla f = \begin{bmatrix} g_x \\ g_y \end{bmatrix} = \begin{bmatrix} \frac{\partial f}{\partial x} \\ \frac{\partial f}{\partial y} \end{bmatrix},$$

where $$\frac{\partial f}{\partial x}$$

is the derivative with respect to x (gradient in the x direction), $$\frac{\partial f}{\partial y}$$

is the derivative with respect to y (gradient in the y direction). The derivative of an image 'A' can be approximated by finite differences. If a central difference is used, $$\frac{\partial f}{\partial y}$$

can be calculated by applying a 1-dimensional filter to an image A by convolution:

$$\frac{\partial f}{\partial y} = \begin{bmatrix} -1 \\ +1 \end{bmatrix} * A,$$

where * denotes the 1-dimensional convolution operation. The gradient direction θ can be calculated by $$\theta = \tan^{-1}\begin{bmatrix} g_x \\ g_y \end{bmatrix},$$

and the magnitude can be given by: $\sqrt{g_y^2 + g_x^2}$.

The method of FIG. 7 further includes stretching the gradient image to generate a stretched gradient image (step 720) The stretching of the gradient image may be performed using contrast stretching, which is an enhancement technique that enhances the contrast in an image by 'stretching' the range of intensity values it contains to span a desired range of values (e.g.. the full range of pixel values that the image type concerned allows). Before the stretching can be performed, an upper pixel value limit 'a' and a lower pixel value limit 'b' over which the image is to be normalized may be specified. For example, these value limits may be the minimum and maximum pixel values that the image type concerned allows. For example, for 8-bit gray level images, the lower pixel value limit 'a' could be 0 and the upper pixel value limit 'b' could be 255. A normalization can then scan the image to find the lowest pixel value 'c' and the highest pixel value 'd' currently present in the image. Then, each input pixel $P_{in}$ can be scaled using the following function:

$$P_{out} = (P_{in} - c)\left(\frac{b-a}{d=c}\right) + a.$$

However, a single outlying pixel with either a very high or very low value can severely affect the value of 'c' or 'd', which could lead to unrepresentative scaling. Therefore, in a different approach, a histogram is first taken of the image, 'c' is selected to be some low non-zero percentile (e.g., $5^{th}$ percentile) and 'd' is selected to be some high non-max percentile (e.g., $95^{th}$ percentile), thereby preventing outliers from affecting the scaling too much. Another approach for dealing with outliers is to use the intensity histogram to find the most popular intensity level in an image (i.e., the histogram peak) and then define a cutoff fraction, which is the minimum fraction of this peak magnitude below which data will be ignored. The intensity histogram can then be scanned upward from 0 until the first intensity value with contents above the cutoff fraction is discovered to define 'c'. Similarly, the intensity histogram can then be scanned downward from 255 until the first intensity value with contents above the cutoff fraction is discovered to define 'd'. Some stretching implementations may also work with color images. In this case, all the channels (e.g., red, green, and blue) may be stretched using the same offset and scaling to preserve the correction color ratios.

The method of FIG. 7 further includes computing a minimum grey value from the stretched image (step 730), and designating a candidate curve among a plurality of available different candidate curves to be the reference curve when all points of the candidate curve are close to the minimum gray value (step 740). For example, a comparison calculation may be performed on each of the candidate curves until one is found where all of its points are close (within a certain range) to the minimum gray value.

Figure 8:
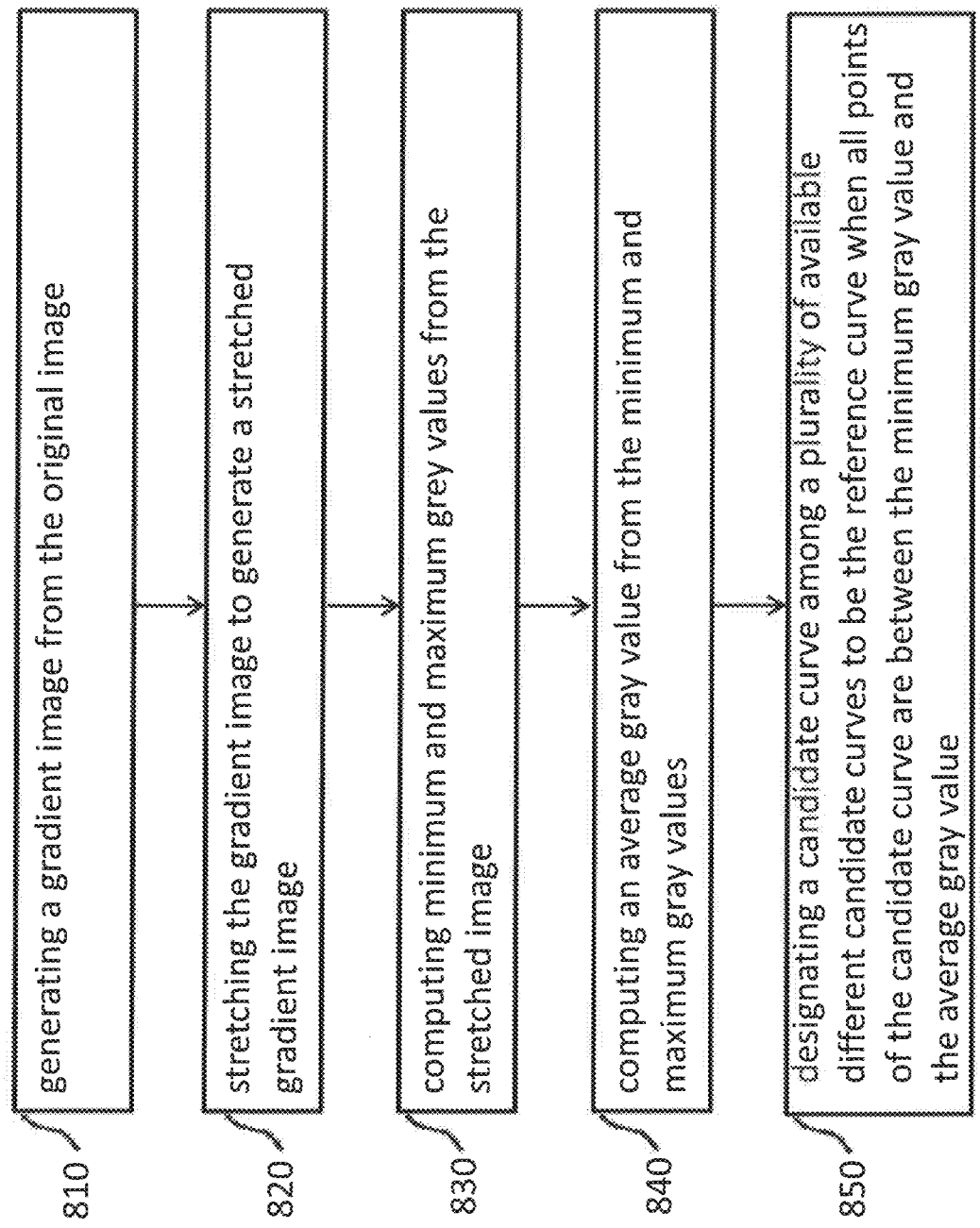
FIG. 8 illustrates another method of determining a curve to be used during the curve fitting algorithm according to an exemplary embodiment of the disclosure.

In an exemplary embodiment, the step 530 of determining the reference curve that best fits the boundary curved is performed using a method illustrated in FIG. 8.

Figure 9A:
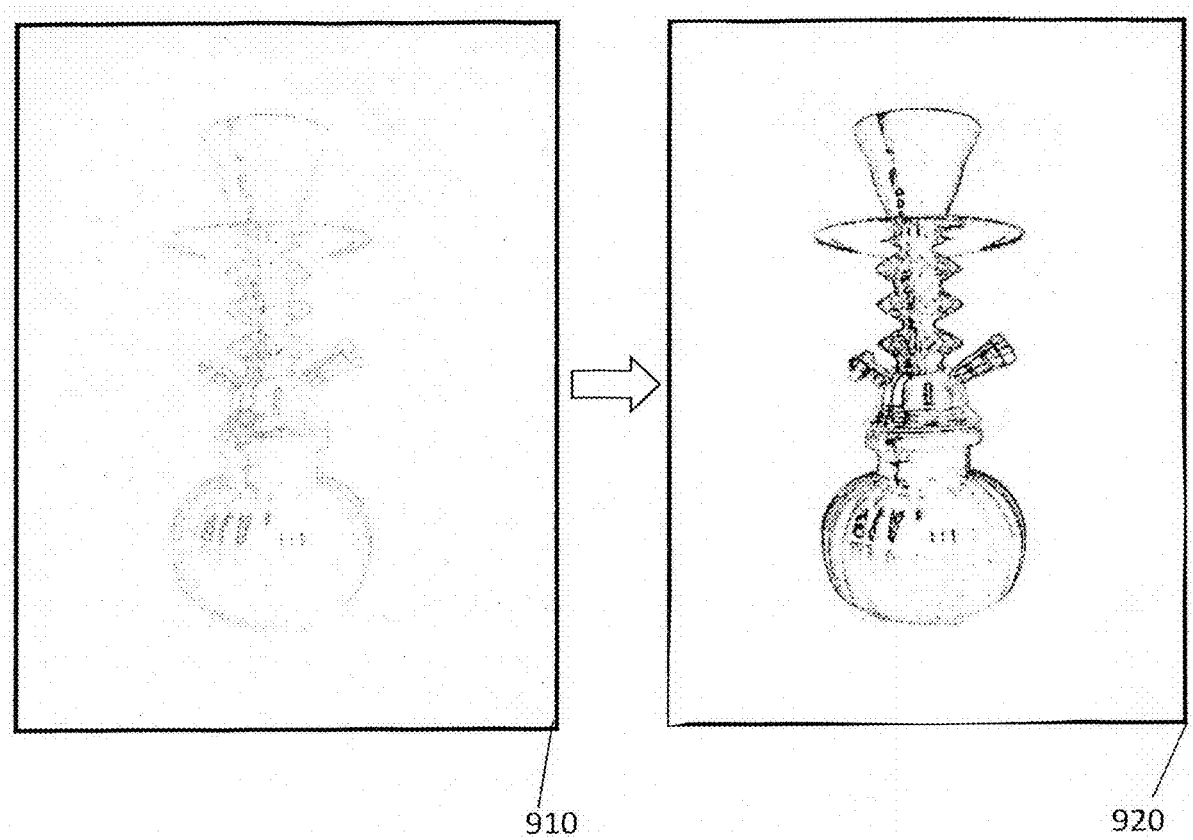
FIG. 9A and FIG. 9B illustrate exemplary images used in the curve fitting according to an exemplary embodiment of the disclosure.
Figure 9B:
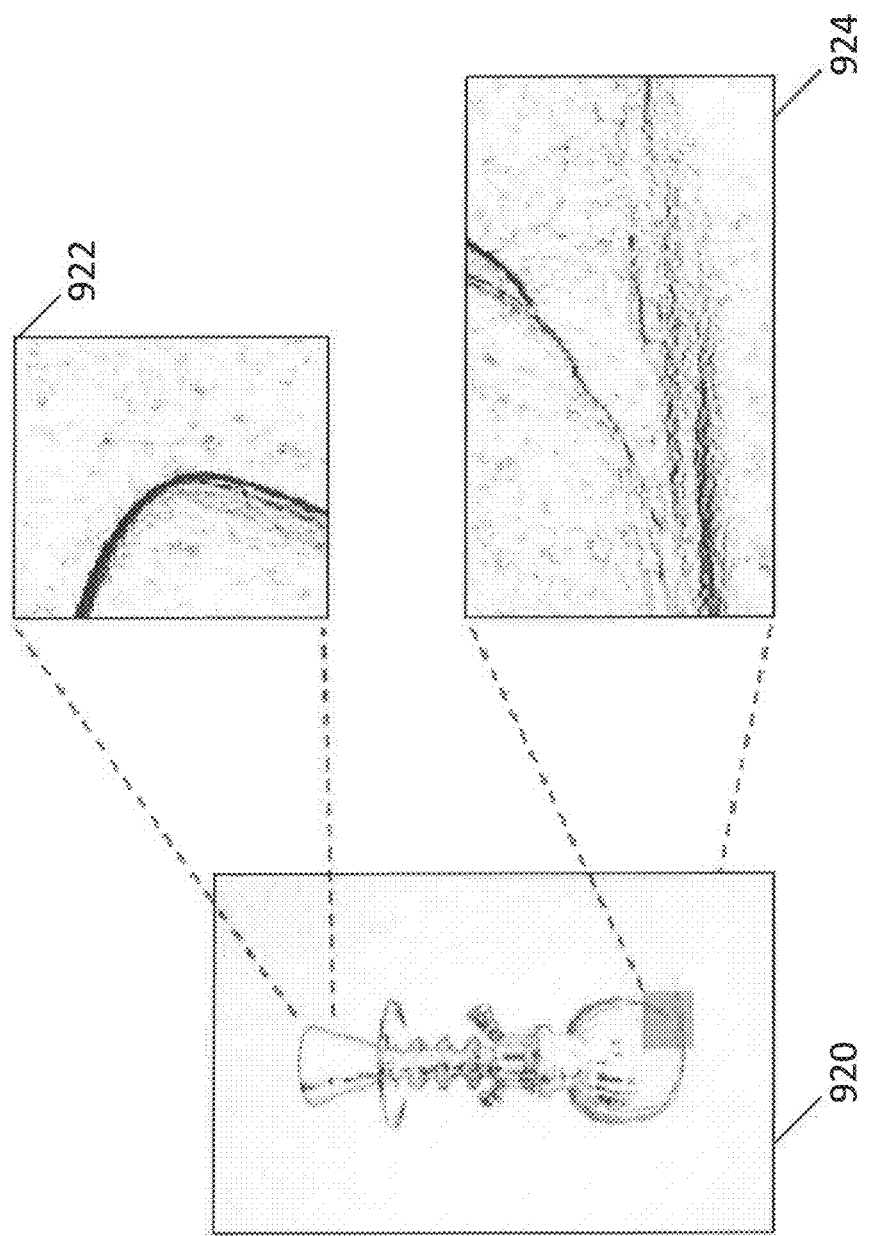

The method of FIG. 8 includes generating a gradient image from the original image (e.g., 410) (step 810), stretching the gradient image to generate a stretched gradient image (step 820), computing minimum and maximum grey values from the stretched image (step 830), determining an average gray value from the minimum and maximum gray values (step 840), and designating a candidate curve among a plurality of available different candidate curves to be the reference curve when all points of the candidate curve are between the minimum gray value and the average gray value (step 850). For example, a comparison calculation may be performed on each of the candidate curves until one is found where ail of its points are between the minimum gray value and the average gray value. FIG. 9A illustrates an example of the gradient image 910 and an example of the stretched gradient image 920. FIG. 913 illustrates exemplary zoomed in regions 922 and 924 of the stretched gradient image 920 so that exemplary boundary artifacts can be observed.

Figure 9C:
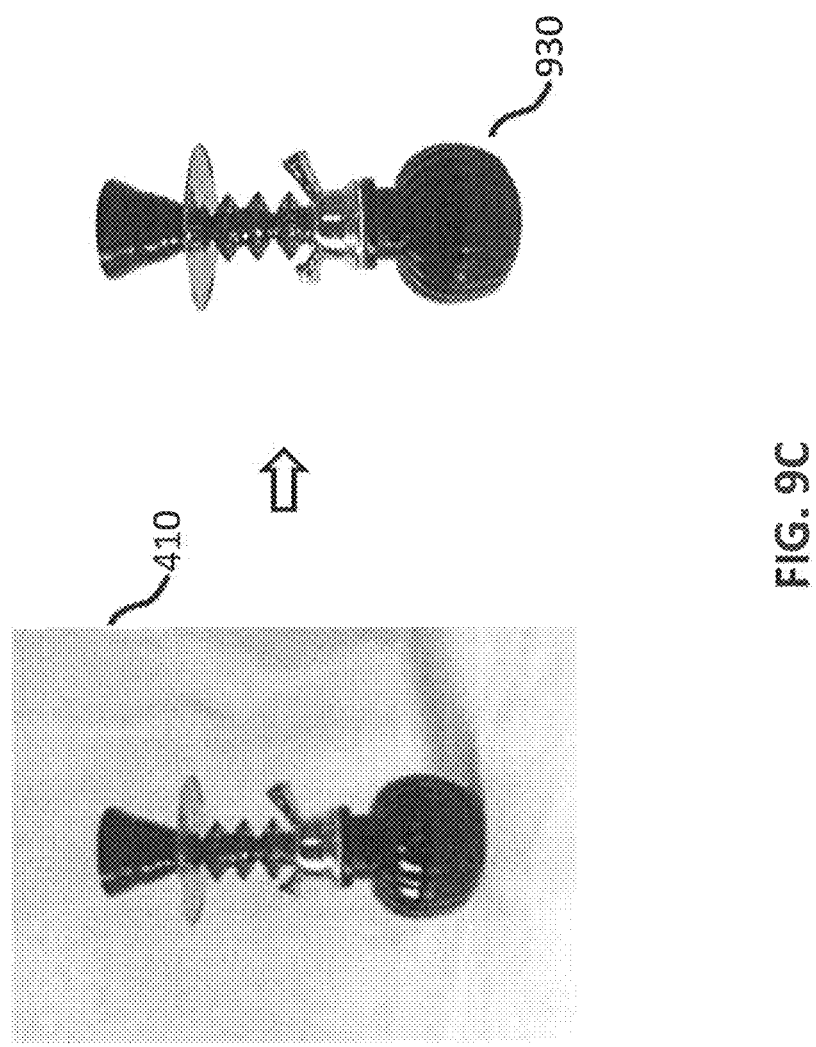
FIG. 9C illustrates an exemplary enhanced image that may result from using image enhancing techniques according to exemplary embodiments of the disclosure.

Referring back to FIG. 1C, the step 170 of generating the enhanced image(s) from the original image and the smoothed boundary image includes applying transformations used to achieve the smoothed boundary image to the original image to generate an enhanced image. For example, the pixels of the artifacts that were removed from the binarized image during the smoothing of the binarized image can be removed from the original image to generate the enhanced image. For example, pixels of the original image having a same location as the pixels of the removed artifacts can be removed or changed to a background color of the original image to generate the enhanced image. FIG. 9C illustrates an example of the enhanced image 930 that was generated from the original image 410 using the above described techniques.

In an exemplary embodiment, the step 170 of FIG. 1C for generating the enhanced image(s) includes performing glare (e.g., reflection) detection and correction on the enhanced image to generate an enhanced image with reduced glare. A glare detection and correction on the enhanced image (i.e., the image having boundary artifacts removed) may reduce artifacts inside an object within the image. Glare may be introduced during product image capture using camera device flash or other lights. Separating the glare from a familiar object in an image is a challenging, ill-posed problem in computer vision.

FIG. 10 illustrates a method of reducing glare according to an exemplary embodiment of the disclosure. The method of FIG. 10 includes computing an intensity of each pixel of an input image (step 1010). The intensity of a given pixel may be computed by the determining red R, green G, and blue B color component values of the given pixel and averaging the color component values together (e.g., (R±G±B)/3). The method of FIG. 10 further includes designating each pixel as belonging to a glare region when its intensity is greater than a certain threshold (step 1020); and performing glare correction on the glare regions using a convolutional encoder-decoder network (e.g., an artificial neural network such as convolutional) (step 1030).

In an embodiment, the deep encoder-decoder network was trained to remove objectionable glare by learning a mapping between image pairs with and without glare. The neural network may have been trained on photo-realistic glare tainted images synthesized from glare free images collected from online sources. The convolutional encoder-decoder neural network (e.g., auto encoders with symmetric skip connections) may include a feature extraction stage, followed by a glare recovery and removal stage operating on features output by the feature extraction stage, followed by a transmission layer restoration stage that operates on an output of the glare recovery and removal stage.

In an exemplary embodiment, the step 170 of FIG. 1C for generating the enhanced image(s) further includes applying various different artificial lighting effects to the enhanced image or the enhanced image with reduced glare to generate a plurality of enhanced images. The artificial lighting effects may be developed considering at least one of a i) mood and texture effect, ii) a dramatic lighting effect, iii) a natural lighting effect, and iv) a soft light effect.

The mood and texture effect works nicely in eCommerce fashion photos because it adds contrast in the photograph. The effect brings out the texture of the product and it intensifies the overall mood in the image. By focusing on mood and texture, customers can gain a better idea of what the product will be like.

The dramatic light effect can be used to achieve a contrasted look of clothes and to create a more emotionally-charged mood in the photo.

The natural lighting effect enables customers to see the full tone of the product being showcased, which may be ideal for fashion eCommerce websites and web-shops.

The soft lighting effect pulls the target object away from the background, and by doing so, the real focus on the subject and products being showcased. Further, the soft light effect may reduce any existing shadows.

For realistic visualization of an input photograph after the target object is extracted, an OpenGL lighting technique may be used. Lighting in actual photography is extremely complicated and depends on many factors, which may be difficult to calculate when processing power is limited. Lighting in OpenGL is therefore based on approximations of reality using simplified models that are much easier to process and look relatively similar. These lighting models are based on the physics of light. One of those models is called the Phong lighting model. The major building blocks of the Phong model consist of 3 components: ambient, diffuse and specular lighting.

Ambient light usually does not come from a single light source, but from many light sources scattered all around the target object. One of the properties of light is that it can scatter and bounce in many directions reaching spots that aren't in its direct vicinity; light can thus reflect on other surfaces and have an indirect impact on the lighting of an object. Algorithms that take this into consideration are called global illumination algorithms.

Ambient lighting by itself may not produce the most interesting results, but diffuse lighting will start to give a significant visual impact on the object. Diffuse lighting gives the object more brightness the closer its fragments are aligned to the light rays from a light source. To calculated diffuse lighting, one needs to compute a normal vector (e.g., a vector that is perpendicular to a vertex of a fragment of an object receiving a light ray) and the directed light ray (e.g., a direction vector that is the difference vector between the light's position and the fragment's position). The directed light ray may be calculated from the light's position vector and the fragment's position vector.

Just like diffuse lighting, specular lighting is based on the light's direction vector and the object's normal vectors, but this time it is also based on the view direction (e.g. from what direction the viewer is looking at the fragment). Specular lighting is based on the reflective properties of light. If we think of the object's surface as a minor, the specular lighting is the strongest wherever we see the light reflected on the surface. A reflection vector can be calculated by reflecting the light direction around the normal vector. Then the angular distance can be calculated between this reflection vector and the view direction and the closer the angle between them, the greater the impact of the specular light. The resulting effect is that a bit of a highlight is observable when a viewer is looking at the light's direction reflected via the object. The view vector is an extra variable needed for specular lighting, which can be calculated using the viewer's world space position and the fragment's position. Then the specular's intensity is calculated, multiplied by the light color and added to the resulting ambient and diffuse components. To get the world space coordinates of the viewer, one uses the position vector of the camera object (which is the viewer). The dot product is calculated between the view direction and the reflect direction and is then raised to the power of a shininess value. The higher the shininess value of an object, the more it properly reflects the light instead of scattering it all around and thus the smaller the highlight becomes. In an embodiment, the shininess value is 32 so that the specular component is not too dominant.

Figure 11:
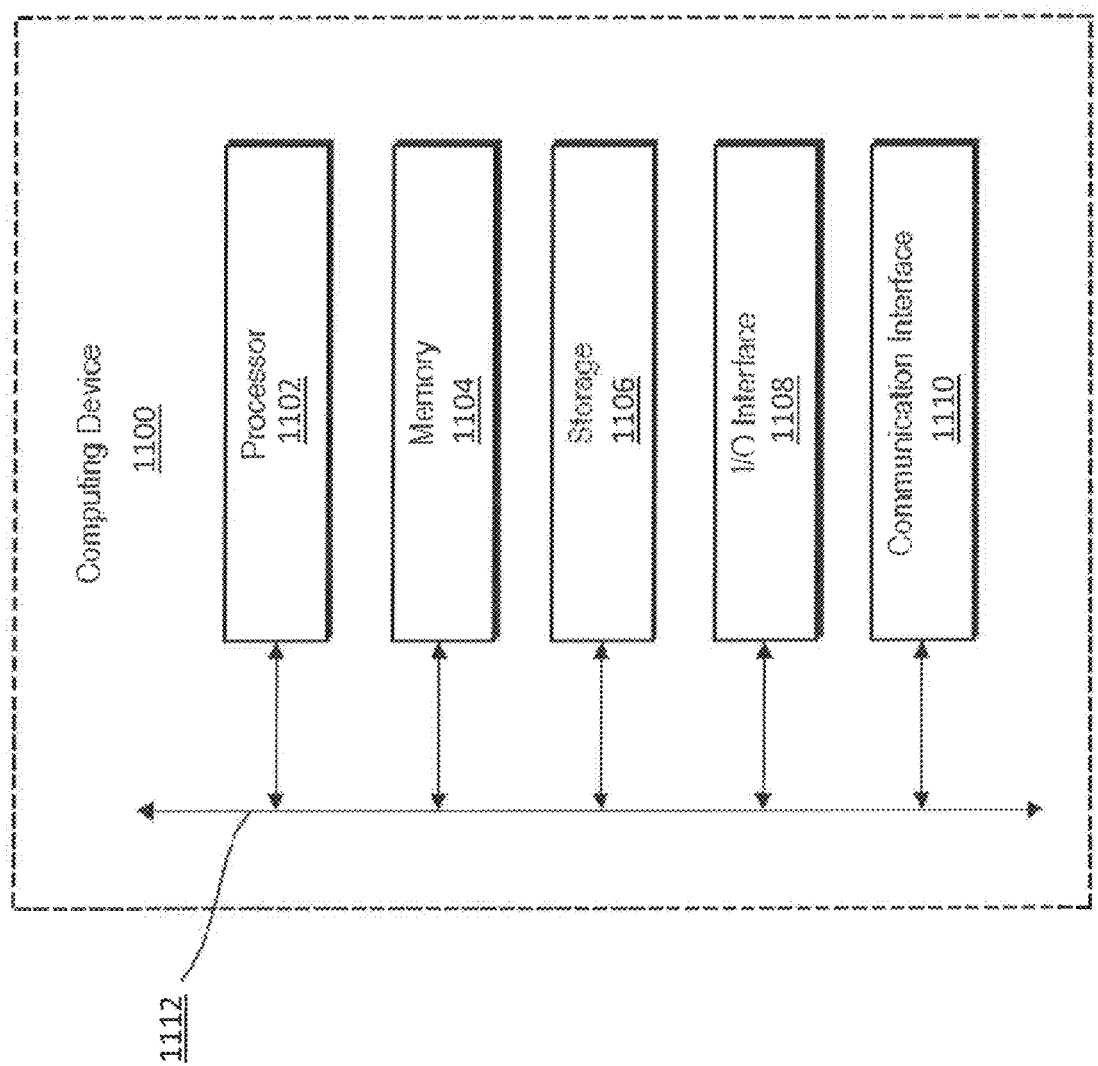
FIG. 11 illustrates an exemplary computing device that may be used to perform one or more methods of the disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., client device 110 or the server 118). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device 110). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

As discussed above, a segmenting may be performed on the original image to generate a segmented image including a plurality of segments, a curve fitting may be performed on the segmented image to determine boundary artifacts, the determined boundary artifacts may be removed from the segmented image to generate a smoothed boundary image, and the enhanced image may be generated from the original image and the smoothed boundary image.

The enhanced image may be generated by determining transformations used to generate the smoothed boundary image and applying the transformations to the original image.

The segmenting may be performed by applying a median filter to the original image to generate a filtered image; creating a gray image from the filtered image; and segmenting the gray image using a convolutional neural network. The segmenting may be performed so that each segment has a different color from another segment.

The curve fitting may include steps of: binarizing the segmented image to generate a binarized image; determining a boundary curve in a region of the binarized image; determining a reference curve that best fits the boundary curve; and designating points of the boundary curve that do not fit the reference curve to be the boundary artifacts.

The determining of the boundary curve may include forming the boundary curve from pixels of the region that are a first color and have at least one neighboring pixel of second color different from the first color.

The determining of the reference curve may include: generating a gradient image from the original image; stretching the gradient image to generate a stretched gradient image;computing a minimum grey value from the stretched image; and designating a candidate curve among a plurality of available different candidate curves to be the reference curve when all points of the candidate curve are close to the minimum gray value.

The determining of the reference curve may include: generating a gradient image from the original image; stretching the gradient image to generate a stretched gradient image; computing minimum and maximum gray values from the stretched gradient image; computing an average gray value from the minimum and maximum gray values; and designating a candidate curve among a plurality of available different candidate curves to be the reference curve when all points of the candidate curve are between the minimum gray value and the average gray value.

A glare correction function may be applied to the enhanced image. The applying of the glare correction function may include computing an intensity of each pixel of the enhanced image; designating each pixel as belonging to a glare region when its intensity is greater than a threshold; and performing glare correction on the glare regions using a convolutional encoder-decoder neural network.

Artificial lighting may be added to an object of the enhanced image. The adding of the artificial lighting may be performed using at least one a mood and lighting effect, a dramatic lighting effect, a natural lighting effect, or a soft light effect.

As discussed above, a cloud-based system interfacing with a client device and including a cloud-based service is provided that performs an image enhancement function on an original image, where the function includes generation of a segmented image from the original image using an artificial neural network, application of a smoothing to edges of the segmented image to generate a smoothed boundary image, and application of transformations used in the smoothing to the original image to generate the enhanced image. The artificial neural network may be a convolutional neural network.

An interface of the client device may include a graphical user interface (GUI) the client device to drag and drop an icon of the original image into an area to cause the original image to be uploaded to a host server of the cloud-based system.

The interface may include a graphical user interface (GUI) that enables the client device to set parameters indicating whether to perform glare correction and whether to add artificial lighting, and additionally sends the parameters to the host server along with the original image. Prior to outputting the enhanced image to the client device, the cloud-based service may perform at least one of glare correction on the enhanced image or adding of artificial lighting to the enhanced image, based on the parameters.

As discussed above, a server for enhancing images is provided including an image enhancement program and an image presentation program.

The image enhancement program may apply a convolutional encoder-decoder neural network to the enhanced image for removing glare.

The image enhancement program may add artificial lighting to the enhanced image using at least one of a mood and lighting effect, a dramatic lighting effect, a natural lighting effect, or a soft lighting effect.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method for generating an enhanced image from an original image, the method comprising:
   segmenting the original image into a segmented image comprising a plurality of segments;
   determining a boundary curve in a region of the segmented image;
   selecting a reference curve;
   designating points of the boundary curve that do not fit the reference curve as boundary artifacts;
   removing the designated boundary artifacts from the segmented image to generate a smoothed boundary image; and
   generating the enhanced image from the original image and the smoothed boundary image.

2. The computer-implemented method of claim 1, wherein the generating of the enhanced image comprises:
   determining transformations used to generate the smoothed boundary image; and
   applying the transformations to the original image.

3. The computer-implemented method of claim 1, wherein the segmenting comprises:
   applying a median filter to the original image to generate a filtered image;
   creating a gray image from the filtered image; and
   segmenting the gray image using a convolutional neural network (CNN).

4. The computer-implemented method of claim 1, wherein the segmenting is performed so that each segment has a different color from another segment.

5. The computer-implemented method of claim 1, wherein the determining of the boundary curve comprises:
   binarizing the segmented image to generate a binarized image; and
   determining the boundary curve in a region of the binarized image.

6. The computer-implemented method of claim 5, wherein the determining of the boundary curve comprises forming the boundary curve from pixels of the region that are a first color and have at least one neighboring pixel of a second color different from the first color.

7. The computer-implemented method of claim 1, wherein the selecting of the reference curve comprises:
   generating a gradient image from the original image;
   stretching the gradient image to generate a stretched gradient image;
   computing a minimum grey value from the stretched image; and
   designating a candidate curve among a plurality of available different candidate curves to be the reference curve when all points of the candidate curve are close to the minimum gray value.

8. The computer-implemented method of claim 1, wherein determining the reference curve comprises:
   generating a gradient image from the original image;
   stretching the gradient image to generate a stretched gradient image;
   computing minimum and maximum grey values from the stretched gradient image;
   computing an average gray value from the minimum and maximum gray values; and
   designating a candidate curve among a plurality of available different candidate curves to be the reference curve when all points of the candidate curve are between the minimum gray value and the average gray value.

9. The computer-implemented method of claim 1, further comprising applying a glare correction function to the enhanced image.

10. The computer-implemented method of claim 9, wherein the applying of the glare correction function comprises:
    computing an intensity of each pixel of the enhanced image;
    designating each pixel as belonging to a glare region when its intensity is greater than a threshold; and
    performing glare correction on the glare regions using a convolutional encoder- decoder neural network.

11. The computer-implemented method of claim 1, further comprising adding artificial lighting to an object of the enhanced image.

12. The computer-implemented method of claim 11, where the adding of the artificial lighting is performed using at least one of a mood lighting effect, a dramatic lighting effect, a natural lighting effect, or a soft lighting effect.

13. A cloud-based system that performs an image enhancement function, the system comprising:
    a cloud-based service configured to execute on a host server, the host server configured to connect to a client device over a computer network and to receive from the client device an upload of an original image across the computer network, and
    wherein the cloud-based service segments the original image into a segmented image using an artificial neural network, applies a smoothing to edges of the segmented image to generate a smoothed boundary image, applies transformations used in the smoothing to the original image to generate the enhanced image, and outputs the enhanced image across the computer network to the client device,
    wherein an interface of the client device includes a graphical user interface (GUI) that enables the client device to set parameters indicating whether to perform glare correction and whether to add artificial lighting, and additionally sends the parameters to the host server along with the original image.

14. The cloud-based system of claim 13, wherein the artificial neural network is a convolutional neural network.

15. The cloud-based system of claim 13, wherein the GUI enables the client device to drag and drop an icon of the original image into an area to cause the original image to be uploaded to the host server.

16. The cloud-based system of claim 13, wherein prior to the output, the cloud-based service performs at least one of the glare correction on the enhanced image or adds the artificial lighting to the enhanced image, based on the parameters.

17. A server for enhancing images comprising:
    a memory storing an image enhancement program and an image presentation program;
    a network interface for communicating with a computer network;
    a processor configured to execute the image enhancement program and the image presentation program,
    wherein the image enhancement program is configured to segment an original image received from a client device through the network interface to generate a segmented image including a plurality of segments, determine a boundary curve in a region of the segmented image, select a reference curve, designate points of the boundary curve that do not fit the reference curve as boundary artifacts, and remove pixels of the original image having coordinates of the boundary artifacts to generate an enhanced image,
wherein the image presentation program is configured to use the network interface to output the enhanced image to the client device.

18. The server of claim 17, wherein the image enhancement program applies a convolutional encoder-decoder neural network to the enhanced image for removing glare.

19. The server of claim 17, wherein the image enhancement program is configured to add artificial lighting to the enhanced image using at least one of a mood and lighting effect, a dramatic lighting effect, a natural lighting effect, or a soft lighting effect.

* * * * *